United States Patent [19]

Lyon

[11] Patent Number: 5,005,988
[45] Date of Patent: Apr. 9, 1991

[54] LINEAR MOTION BEARING

[75] Inventor: Gregory S. Lyon, Manorhaven, N.Y.

[73] Assignee: Thomson Industries, Inc., Port Washington, N.Y.

[21] Appl. No.: 500,404

[22] Filed: Mar. 28, 1990

[51] Int. Cl.⁵ .............................................. F16C 31/06
[52] U.S. Cl. ..................................................... 384/44
[58] Field of Search ...................... 384/44, 43, 45, 168

[56] References Cited
U.S. PATENT DOCUMENTS 4,553,794  11/1985  Teramachi ............................ 384/44
4,563,045   1/1986  Katayama .
4,576,422   3/1986  Laszlo et al. .

Primary Examiner—Lenard A. Footland
Attorney, Agent, or Firm—Dilworth & Barrese

[57] ABSTRACT

A linear motion bearing is disclosed which includes a rail having a plurality of load bearing surfaces and a carriage which rolls smoothly along the rail to slidably support any of a plurality of devices such as individual tools, pillow blocks, etc. The bearing carriage includes a plurality of rolling element surfaces which define with the load bearing surfaces of the rail, load bearing raceways for reception of cylindrical rollers. The carriage further defines return raceways which communicate with the loaded bearing raceways for conducting the rollers between the loaded and return raceways. The loaded bearing surfaces have a unique convex shape facing the working surfaces of the rollers and thereby avoid undue stresses otherwise occurring at the roller ends. A plurality of molded plastic roller retainers are provided with integral inner end caps to guide the rollers between loaded and return raceways. Outer end caps are positioned thereover to seal the bearing and facilitate lubrication. All but central roller retainers are preferably provided in two half secions, while the central retainers extend the length of the carriage. In alternate embodiments, the retainers are formed separate from the inner end caps and may be attached by ultrasonic welding or gluing, etc.

14 Claims, 6 Drawing Sheets

LINEAR MOTION BEARING

BACKGROUND OF THE INVENTION

1. Field Of the Invention

The present invention relates to anti friction linear motion bearings and, more particularly, to improvements in roller races and roller retainers for such bearings.

2. Description of the Prior Art

Linear motion bearings are well known in the art and are used extensively in a wide variety of machines, machine tools, and other equipment where one part is to be moved longitudinally with respect to another. These bearings generally include an inverted U-shaped bearing carriage mounted astride a modified I-beam or T-beam shaped rail. One or two pairs of tracks and returns are provided in the carriage for a plurality of recirculating rolling elements, such as balls or rollers. These rolling elements travel alternately through load bearing tracks and return tracks to provide movement along the rail with minimum friction. End caps are located on either end of the carriage and usually are provided with turnarounds formed therein for transferring the recirculating rolling elements from load bearing tracks to return tracks. The turnarounds are formed by a shaped track connecting a load track to a return track. End caps are provided which include an inner guide at the center of the track, to smooth the movement of the rolling elements around the curved portion from the load track to the return track and to prevent the rolling elements from bunching up in the turns. These end caps are usually formed out of plastic material using molds which form the curved tracks of the turnaround integral with the end cap. However, it is difficult to provide a mold having an inner guide integral with the end caps. In fact, the inner guides are usually molded in a separate operation and inserted into the proper position in the end cap during the assembly of the bearing. These separately molded inner guides are extremely small and easily misaligned or even overlooked during assembly. Further, where the linear motion bearings incorporate an integral lubrication system, the inner guides may be formed to be installed in only one orientation to provide adequate lubrication to the tracks. See, for example, U.S. Pat. No. 4,743,124 to Blaurock. These inner guides can be easily inverted during assembly, resulting in premature operational failure due to inadequate lubrication.

When the recirculating rolling elements are in the load bearing track area of the bearing carriage, they are held movably within the track by a rolling element retainer. This structure facilitates assembly and disassembly of the linear motion bearing by preventing the rolling elements in the load bearing track from falling out when the bearing carriage is removed from the rail. Rolling element retainers are generally of two types. In one type, half of the retainer is incorporated into each end cap and interlocks with the opposite retainer and end cap in the middle of the bearing carriage when the bearing is assembled. See U.S. Pat. Nos. 4,743,124 to Blaurock; 4,420,193 and 4,376,557 to Teramachi et al. These types of bearings are inherently difficult to mold. Further assembly is made more difficult by the need to use special equipment to load the recirculating rolling elements into the tracks.

The other type of retainer is formed as a separate structure and interlocks into the end caps for support. See for example, U.S. Pat. Nos. 4,502,737 to Osawa and 4,582,369 to Itoh. These bearings are easier to mold or fabricate than the first mentioned bearings. However, they also present difficulties in assembly. More specifically, the retainer must be held in place until the recirculating rolling elements are inserted and both end caps are secure.

Other difficulties which arise with such bearings relate to proper load distribution between the rolling elements and the races. Some bearings utilize balls or spherical rollers as rolling elements. Still others utilize straight rollers to increase the load carrying capability. See for example, U.S. Pat. No. 4,572,590 to Teramachi.

In bearings which utilize balls, the orientation of the loaded raceways, the balls and the rails are such that any applied force or moment is resisted by reaction forces in at least two raceways. While this configuration effectively distributes the load, it is limited by the contact that occurs at the reaction of the ball and either the raceway or the rail. The ability of the bearing to withstand high loads is also determined by the deformation of the body of the bearing, as such reactions may cause the ball-race/rail orientations to change.

As noted, generally the load carrying capability of linear motion bearings is increased by utilizing cylindrical rollers for the rolling elements. These bearings include a plurality of essentially cylindrical rollers in place of balls. In some instances the cylindrical rollers are chained, in order to maintain positional control. See for example, U.S. Pat. No. 4,563,045 to Katayama. While the reaction of a cylindrical roller on a flat rail or race is more effective in transmitting load, due to the increased surface area, end effects and concentrated edge loading can produce extremely high localized stresses, which can decrease the effective load which the bearing may carry. Additionally the carriage body of the bearing is subject to deformation upon loading, thus altering the orientation of the roller to the race or rail, and aggravating the high stress conditions as the roller ends.

Attempts have been made to decrease the effects of the above mentioned high stress condition in the rollers by modifying the shape of the rollers. Typical of this approach is the use of spherical rollers and lightly crowned cylindrical rollers in place of the essentially straight cylindrical rollers. The use of crowned rollers and/or spherical rollers avoids some of the edge and end loading problems described above, but inherently reduces the load capacity of the bearing, as there is a smaller contact area. Additionally, the fabrication of specially shaped spherical and crowned rollers is more difficult and expensive to produce than essentially cylindrical rollers. For example, such rollers require additional manufacturing steps such as grinding, etc.

I have invented a linear motion bearing which provides effective load distribution utilizing cylindrical rollers while incorporating a unique system of retainer elements and end caps associated therewith. The present invention thus provides improved load carrying capability for the bearing, while avoiding the above mentioned problems associated with deformation of the load carrying components. Further, the assembly of the bearing according to the present invention has been simplified, thus facilitating predictable and precise operation.

SUMMARY OF THE INVENTION

Linear motion bearing which comprises rail having load bearing surfaces; and bearing carriage having rolling element surfaces which define with the load bearing surfaces of the rail, load bearing raceways for reception of a plurality of cylindrical rolling elements. The carriage further defines return raceways communicating with the load bearing raceways for conducting the plurality of cylindrical rolling elements between the load bearing raceways and respective return raceways. The rolling elements support the carriage with respect to the rail when in a load bearing raceway. Each load bearing surface has a portion which contacts the rolling elements generally centrally thereof and is configured to define a space between the surface and each rolling element end portion.

In the preferred embodiment the load bearing tracks define convex surfaces such that the reaction on the rollers and races produces an ellipse of a large area capable of supporting high loads and tolerant of misalignment in the axial direction.

The geometry of the roller is straight cylindrical, thus inexpensive to manufacture. The convex races provide no additional manufacturing cost. The races are also more tolerant to misalignment.

A plurality of roller retainers are provided in conjunction with an inner roller guide at each end of the bearing. The roller retainers may be formed integrally with, or adhesively or ultrasonically attached to the inner roller guide and thus reduce assembly time and potential error. The roller retainers are preferably of a low friction material such as nylon or nylon filled with a lubricating medium such as teflon. The inner roller guide members and the outer end caps function in conjunction with each other to facilitate free roller travel between loaded and unloaded raceways.

In the preferred embodiment, the linear motion bearing comprises a rail having a plurality of load bearing surfaces having a generally convex cross-sectional configuration, and a bearing carriage having a plurality of load bearing surfaces which define with the load bearing surfaces of the rail, a plurality of load bearing raceways for reception of a plurality of cylindrical rolling elements. The carriage further defines a plurality of return raceways communicating with the load bearing raceways for conducting the plurality of cylindrical rolling elements between the load bearing raceways and respective return raceways. The rolling elements support the carriage against the rail when in a load bearing raceway. Each load bearing surface has a generally convex cross-sectional configuration such that the surface contacts the rolling elements generally centrally thereof. Roller retainer means are configured and dimensioned to retain the rolling elements in position in the raceways. The roller retainer means are connected at each end thereof to an inner guide cap defining guide means for guiding the rolling elements between the load bearing raceways and the return raceways. An outer end cap is positioned over each inner guide cap and include turnaround tracks connecting the load bearing raceways and the return raceways.

BRIEF DESCRIPTION OF THE DRAWINGS

Preferred embodiments of the invention are described hereinbelow with reference to the drawings wherein.

DETAILED DESCRIPTION OF THE PREFERRED EMBODIMENTS

Figure 1:
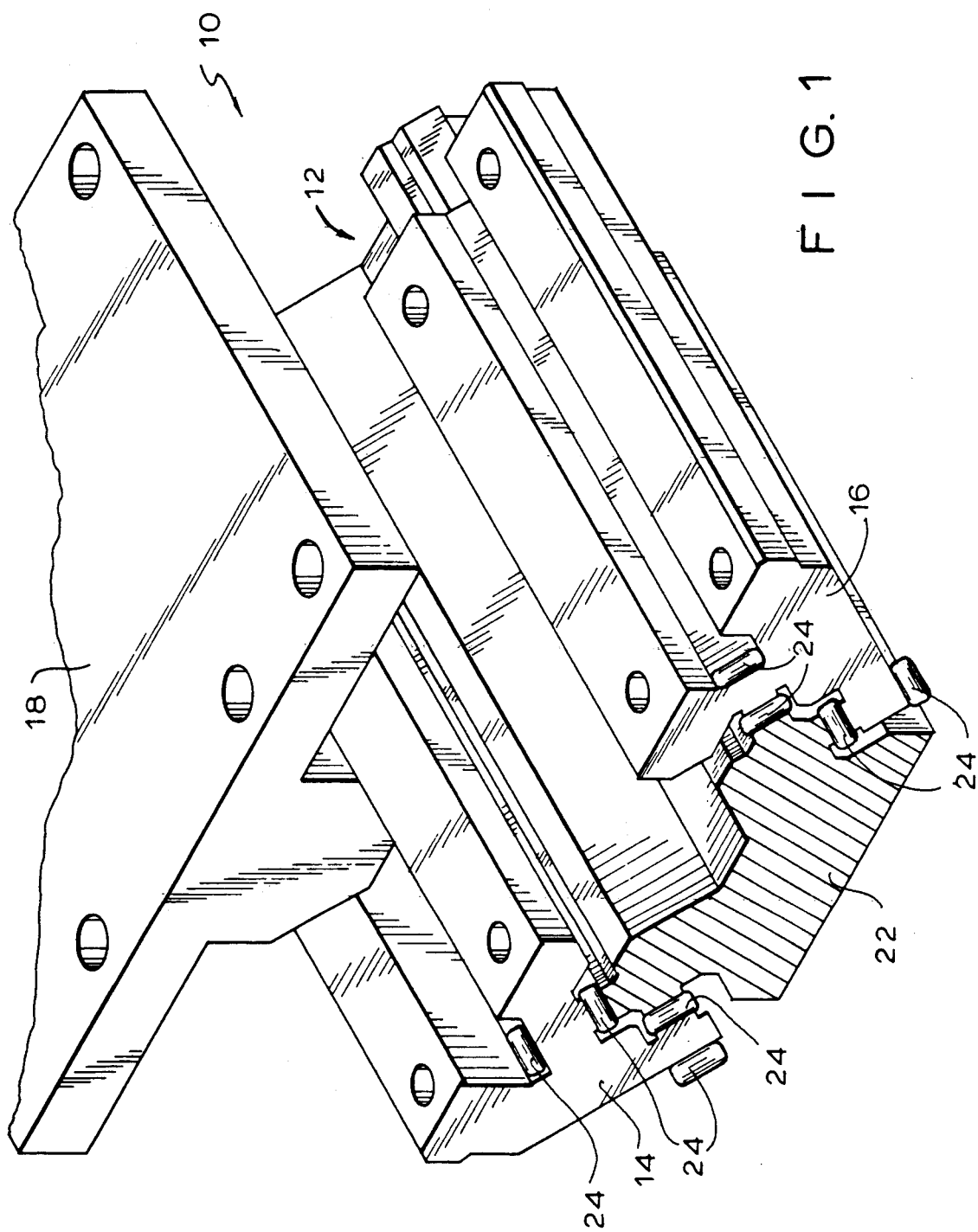
FIG. 1 is a perspective view, with parts separated and removed for illustration purposes, of a linear motion bearing constructed according to the invention.
Figure 2:
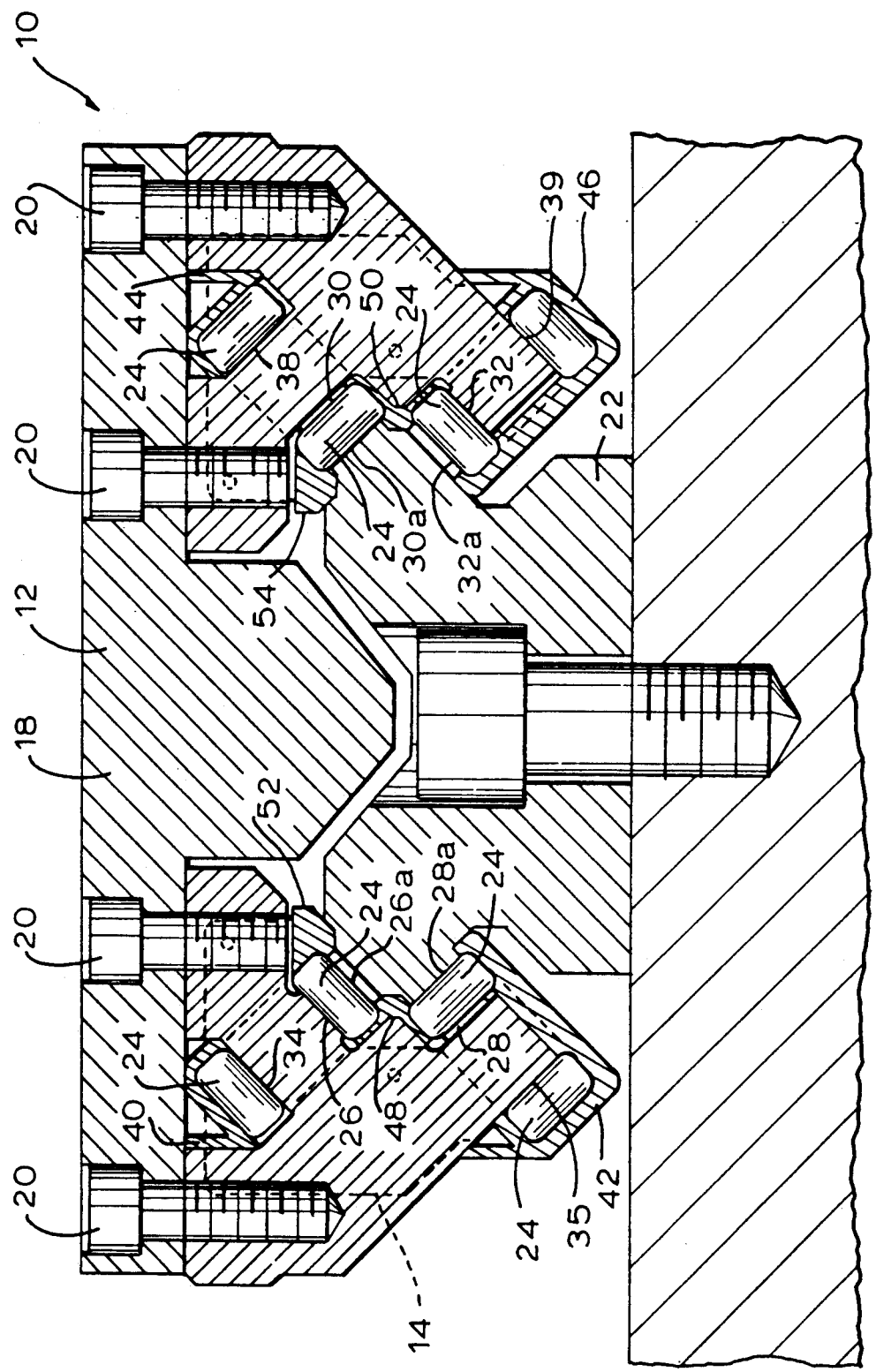
FIG. 2 is a cross-sectional view of a linear motion bearing constructed according to the invention, illustrating the carriage, the rail and the roller retaining elements in assembled condition.

Referring initially to FIG. 1, there is shown a perspective view, with parts separated for illustration purposes, of a linear motion bearing 10 constructed according to the invention. In the embodiment shown in FIG. 1, carriage body 12 is formed of three components, including bearing members 14, 16 and top plate 18 attached thereto by bolts 20 as shown in FIG. 2. Carriage body 12 is supported on rail 22 by rollers 24 which are shown in position in FIG. 2; however, for convenience of illustration, the roller retainers and end caps which form a major feature of the present invention, are not shown in FIG. 1. For this reason in the absence of the roller retainers, the rollers 24 are otherwise shown partially unsupported in FIG. 1.

Referring now to FIG. 2, a cross-sectional view of the linear motion bearing 10 of FIG. 1 is shown, illustrating carriage body 12 and rail 22, constructed according to the present invention. Bearing carriage body 12 is shown having four load bearing surfaces 26, 28, 30 and 32 and four return surfaces 34, 35, 38, and 39. Rail 22 includes corresponding load bearing surfaces 26a, 28a, 30a and 32a which combine with the load bearing surfaces 26, 28, 30 and 32 of carriage body 12 to form two pairs of load bearing raceways, for a plurality of rolling elements, in this case, rollers 24.

Carriage body 12 is formed of two bearing members 14, 16, shown bolted to a top plate 18 with bolts 20. Cylindrical rollers 24 are shown in position within load bearing raceways respectively defined by load bearing surfaces 26, 28, 30 and 32 of carriage 12 and load bearing surfaces 26a, 28a; 30a and 32a of rail 22.

Figure 3:
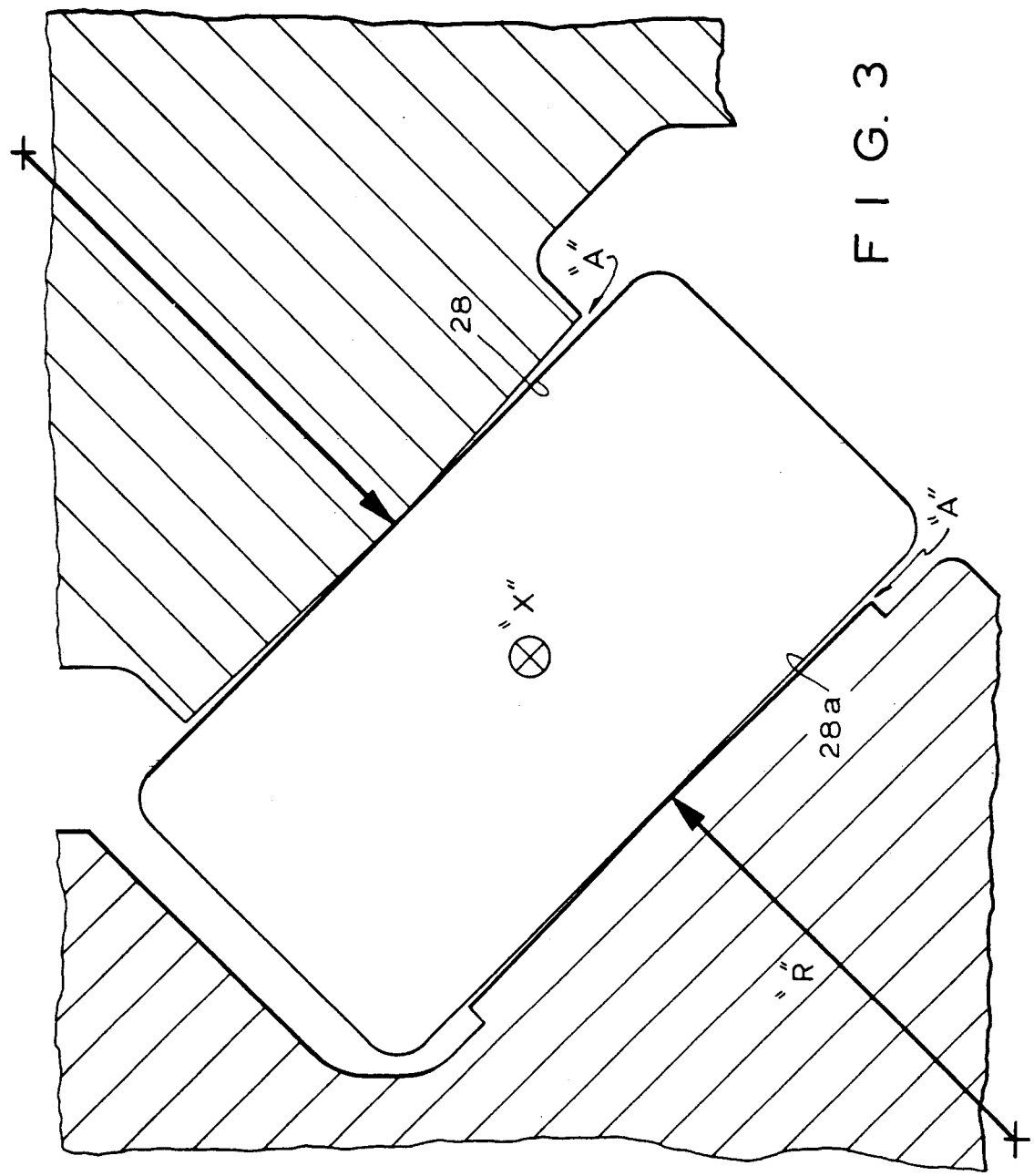
FIG. 3 is a greatly enlarged view of a typical race and roller in a load bearing raceway of the bearing shown in FIG. 1, illustrating the feature of the convex load bearing surface of the present invention.

FIG. 3 is a greatly enlarged view illustrating the position of the rollers 24 in a typical load bearing raceway defined by the carriage and the rail, for example load bearing surfaces 28 and 28a of FIG. 1. The surfaces 28 and 28a shown in FIG. 3 illustrate a feature of one embodiment of the present invention. In this embodiment the load bearing surfaces—or—"tracks"—28 and 28a are defined by a large radius "R" which defines a convex surface facing toward the outer working surface of the roller on each side. The roller is free to rotate or "rock" about an axis "X" transverse to its rolling axis (and its direction of travel), through a limited arc, while maintaining the initial contact area, the configuration, and position with respect to the raceways. With the structure shown, deformations of the rail and carriage under loaded conditions will not produce substantial stress concentrations at the ends of the rollers due to the clearance "A" shown at each end in FIG. 3. As noted, such stress concentrations were typically common in bearings of the prior art constructions where continuous contact was made between cylindrical rollers and flat load bearing surfaces.

Figure 4:
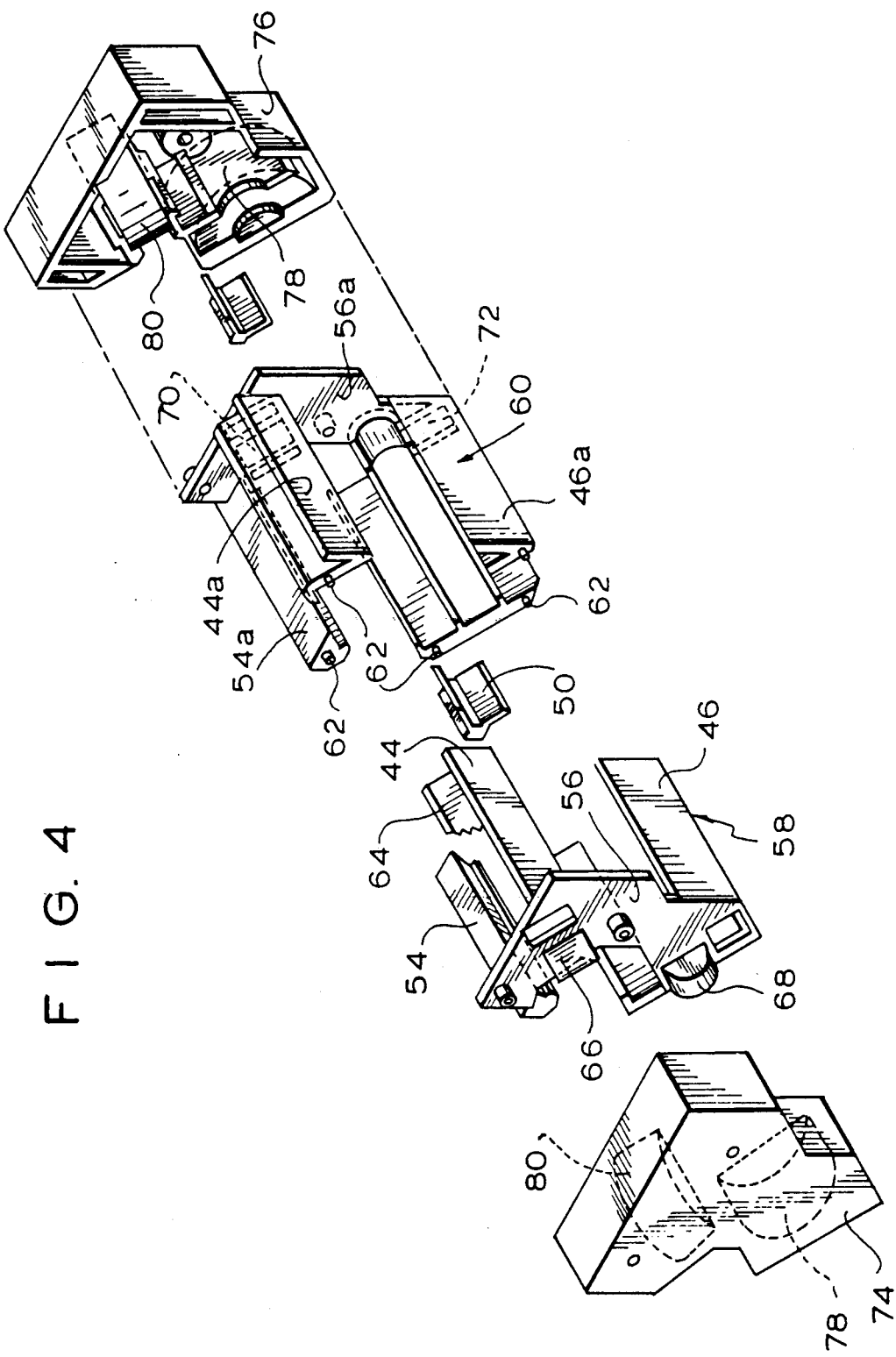
FIG. 4 is a perspective view, with parts separated for illustration purposes, of the outer end cap and inner roller recirculation guide, with connected roller retaining elements illustrated in perspective.

Referring again to FIG. 2, the load bearing raceways defined respectively by surfaces 26, 28, 30 and 32 and 26a, 28a, 30a and 32a communicate respectively with unloaded return raceways defined in part by surfaces 34, 35, 38, 39 of carriage body 12 as shown, and further by specifically configured roller retainers shown in FIGS. 2 and 4. These return raceways serve to conduct rollers toward and away from the load bearing raceways. When the rollers 24 are positioned within these return raceways they are unloaded. Accordingly, the surfaces 34, 35, 38, 39 need not be particularly shaped as in the case of the loaded bearing surfaces.

Referring once again to FIG. 1 in conjunction with FIGS. 2 and 4, the roller retainer feature of the present invention is illustrated. Rollers 24 are retained and controlled in the loaded raceways and the return raceways by roller retainer elements 40, 42, 44, 46, 48, 50 52 and 54 as shown in FIG. 2. In the load bearing raceways the retainer elements support the rollers 24 generally at their end faces as shown and where the surfaces are undercut and the retainer overlaps a portion of the working surface of the roller; however, the actual load support is provided by the load bearing surfaces described previously. In the return raceways the rollers are supported by the retainer elements on their end faces as shown, and on their rolling surfaces as well, since they are unloaded in these raceways. In this regard, see for example, retainers 40, 42, 44, 46. Central roller retainers 48 and 50 support both sets of rollers on their end faces in the load bearing raceways. Roller retainers 52, 54 support the rollers on their end faces and on minor portions of their rolling surfaces adjacent undercut zones as shown. Accordingly, the rollers are prevented from being removed from the bearing by the enveloping feature provided by the retainer elements.

The retainer elements 40, 42, 44, 46, 48, 50, 52 and 54 are preferably constructed of low friction material such as nylon. Such materials as nylon or nylon filled with a suitable lubricating medium such as teflon or graphite are preferred. They are preferably provided as separate components molded integrally with the inner roller recirculation control guide 56, as shown in FIG. 4. Accordingly, free rolling motion is permitted by the retainers.

Referring now to FIG. 4, the roller retainers are provided as separate molded retainer assemblies 58, 60 having inner recirculation control guide 56, 56a molded integrally therewith at each end. The right hand assembly 60 shown in FIG. 4 includes roller retainers 44a, 46a, and 54a having integral pins 62 and the left hand assembly 58 includes roller retainers 44, 46 and 54 having at their end faces, corresponding apertures 64 (not shown) configured to receive the pins 62. The carriage body components are first assembled with central retainers 48, 50 in position. When the carriage components are assembled with the rollers 24 in position, each roller retainer component 58, 60 is respectively inserted into position from each end such that pins 62 enter apertures 64. The components 58, 60 are attached by suitable means such as ultrasonic welding, bonding, gluing, etc. at the joinder of the pins and the apertures prior to assembly, central roller retainer 50 is inserted into position. Thus it can be readily appreciated that assembly of the bearing has been substantially simplified.

Figure 5:
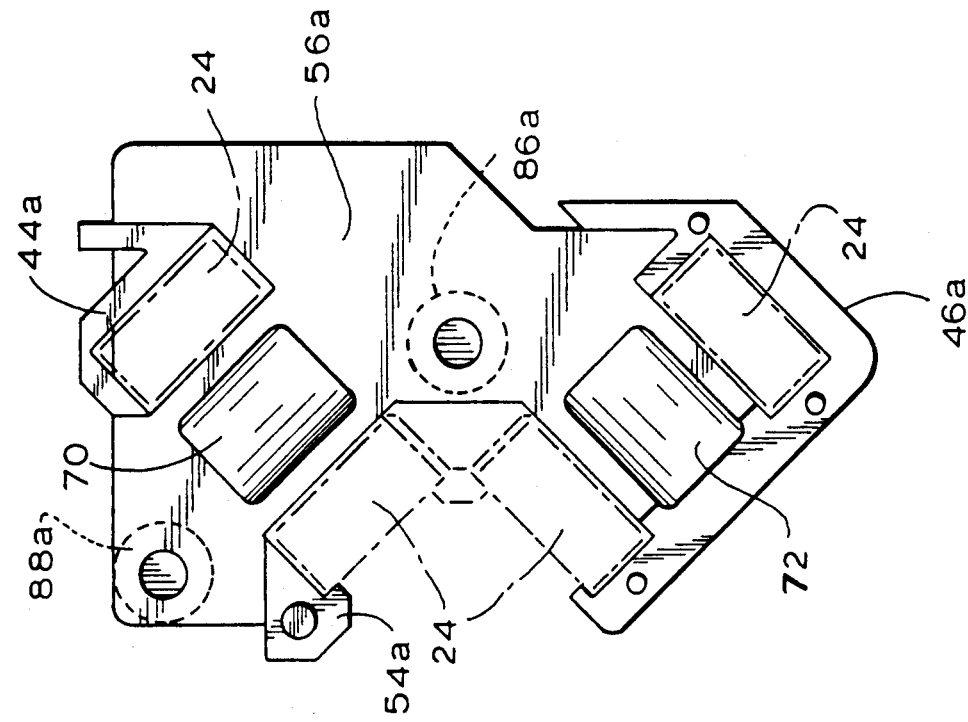
FIG. 5 is a plan view of the inner roller recirculation guide shown in FIG. 4 showing the roller retainer elements which are attached to the guide.

Referring to FIG. 5, an exemplary roller recirculation guide 56a is shown in plan view with rollers 24 shown in phantom lines. The semi-circular roller guide members 70, 72 are shown. Retainers 44a, 46a, 54a are shown as part of the roller guide 56a. Central retainer 50 is shown in phantom lines as a component separate from the inner guide 56a. This central retainer is actually formed as a single member and extends the length of the carriage and through inner guides 56, 56a.

The inner roller recirculation control guides 56, 56a include semi-circular members 66, 68, 70, 72 formed integrally therewith as shown to guide rollers between the loaded and unloaded raceways.

Figure 6:
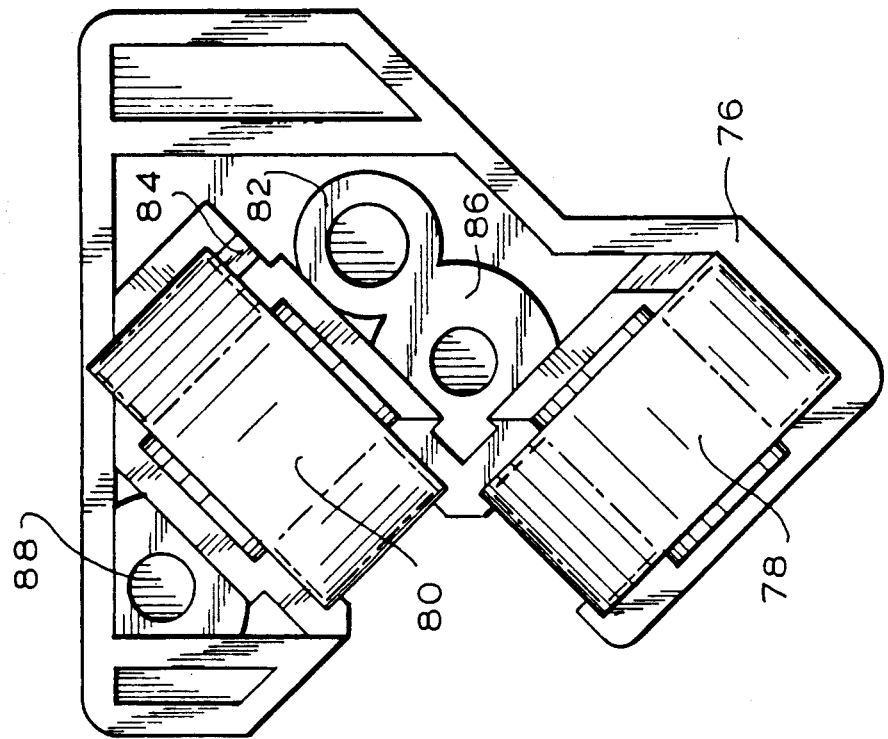
FIG. 6 is a plan view of one of the outer end caps shown in FIG. 4.

Referring now to FIG. 6, exemplary outer end cap 76 includes roller recirculation control shell 78, 80 which are cylindrical in cross-section as shown in FIG. 4 and which are formed within the end cap 76 to receive semi-circular roller guide members 70, 72 shown in FIGS. 4 and 5. Cylindrical shells 78, 80 are of cross-sectional radius greater than the radius of semi-circular control members 70, 72 of inner guides 56. Thus the cylindrical openings 78, 80 and the guide members 70, 72 define an arcuate space which facilitates unimpeded roller travel between the loaded and unloaded raceways. Except for reverse orientation of shape where indicated, the remaining end caps are the same as end cap 76.

The inner roller recirculation control guides 56, 56a are precisely fitted within outer end caps 74, 76. Each inner roller recirculation control guide is positioned with the roller retainers in position. The central retainer 50 is inserted in position so as to extend through each inner guide 56, 56a at each end. The outer end caps 74, 76 are positioned over each inner roller control guide 56, 56a. With the retaining elements integrally molded to inner roller guide 56, 56a, positioning of the rollers and retainers is accomplished simultaneously. The alignment of the inner control guide 56, 56a and the outer end caps 74, 76 facilitates free roller travel between the loaded and unloaded raceways. Outer end caps 74, 76 are adapted to be sealed to the end face of the bearing member 14 such that the internal shell of the end caps 74, 76 serve as a reservoir for lubricants introduced through a grease nipple (not shown) which will be positioned within aperture 82. Lubrication channels 84 are provided at the return location of the end cap 74, 76 to permit lubricants to come in contact with as many rollers as possible before escaping.

The advantages of the present invention over the prior art will be readily appreciated by persons skilled in the art. For example, the retainer elements 40, 42, 44, 46, 48, 52 and 54 are molded integrally with the inner roller guide members 56, 56a as shown, or they may be connected by adhesives to each other. In another embodiment the roller retainer elements may be adhesively connected to the faces of both inner roller guides 56, 56a on both sides of the bearing. According to still another embodiment, the retainer elements may be ultrasonically welded at each opposing ends to inner roller guides 56, 56a.

In the preferred embodiment, inner roller guides 56, 56a may be positioned with roller retainers in place as described above. A first outer end cap 76 may be attached to the inner guide by screws, bolts, etc, through retainer support boss 86, 88, 86a, 88a or extended through the boss to an optional threaded opening (not shown) in the bearing members. The bearing is then filled with appropriate rollers from the opposite end. The remaining end cap may then be attached in a similar fashion.

As noted, according to the preferred embodiment the roller retainers are integrally molded with inner roller guides 56, 56a and are positioned within the bearing from either end with pins 62 positioned within apertures 64. The members are attached by ultrasonic welding, gluing, etc.

It can been seen that according to the present invention, there is provided essentially cylindrical rollers contacting convex surfaces of the races in a linear roller bearing. In the preferred embodiment the reaction of the rollers and races produces an ellipse of large area capable of supporting high loads and tolerant of misalignment in the axial direction.

Figure 7:
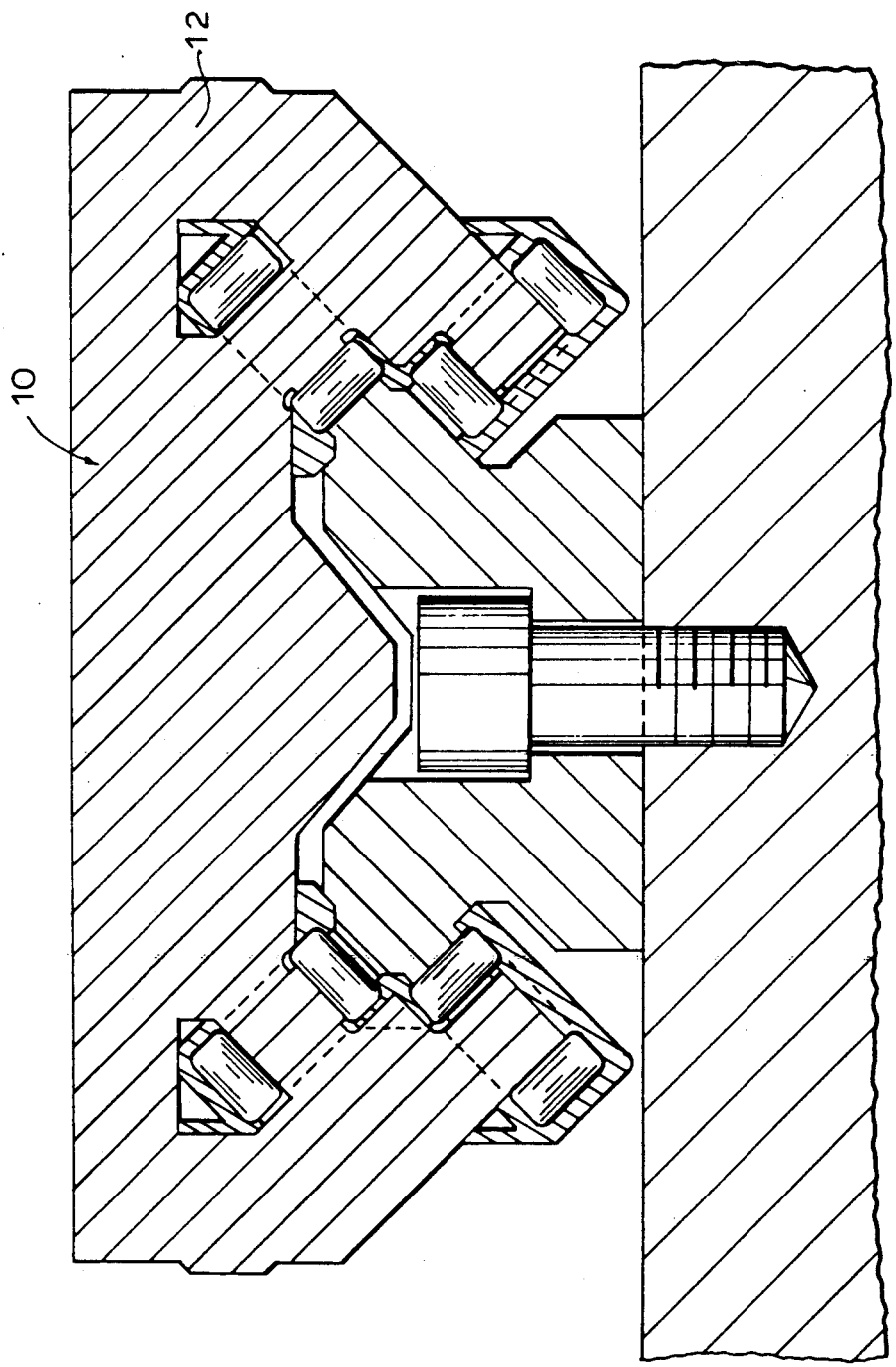
FIG. 7 is a cross-sectional view of an alternative embodiment of the present invention incorporating a unitary carriage.

Referring to FIG. 7, there is shown a bearing 10 constructed according to an alternative preferred embodiment of the invention wherein the bearing carriage 12 is a unitary member. Thus, the three component arrangement of FIG. 2 may be replaced with the embodiment of FIG. 7.

In summary, the geometry of the rollers provides an easily manufactured rolling element of relatively low cost and eliminates the need to crown the roller as was practiced in the prior art. The convex load bearing tracks provide no additional expense with respect to normal precision rail manufacture.

The provision of low friction roller retaining elements to retain the rollers in their unloaded positions in the manner described facilitates quick and simple assembly devoid of the potential to misalign or incorrectly install a component. The retainers may be assembled in the bearing as shown and described. Alternatively, they may be formed as continuous members assembled to one inner roller guide and inserted into the bearing. Thereafter, they may be adhesively or ultrasonically attached to the inner roller guide at the other end. Thus the assembly of the bearing is simplified with the present invention.

The construction of the roller retainers as disclosed herein allows for minimal friction linear motion characteristic of a roller bearing, without the concentrated stresses due to edge and end roller loading. The convex race allows mobility of the contact ellipse such that the contact ellipse is maintained in the event of misalignment about the axial direction.

What is claimed is:

1. Linear motion bearing which comprises:
 rail having load bearing surfaces; and
 bearing carriage having rolling element surfaces which define with said load bearing surfaces of said rail, load bearing raceways for reception of a plurality of cylindrical rolling elements, said carriage further defining return raceways communicating with said load bearing raceways for conducting said plurality of cylindrical rolling elements between said load bearing raceways and respective return raceways, said rolling elements supporting said carriage with respect to said rail when in a load bearing raceway, each said load bearing surface having a portion which contacts said rolling elements generally centrally thereof and being configured to define a space between said surface and each rolling element end portion.

2. Linear motion bearing according to claim 1 wherein each load bearing surface defined by said carriage has a generally convex cross-sectional configuration.

3. Linear motion bearing according to claim 2 further comprising a plurality of roller retainers to support said rollers within said raceways.

4. Linear motion bearing according to claim 3 further comprising inner roller guide means connected to said retainers at each end of said carriage.

5. Linear motion bearing according to claim 4 wherein said plurality of retainer and inner guide means comprises roller retainer members extending over the length of said carriage and supporting said rolling elements at their end faces in said load bearing raceways.

6. Linear motion bearing according to claim 5 wherein said roller retainer members are fabricated of a low friction material adapted to support said rollers at their end faces and at end portions adjacent thereto while permitting rotation thereof.

7. Linear motion bearing according to claim 6 wherein said inner roller guide means comprises an inner roller guide member positioned at each end portion of said carriage and rail.

8. Linear motion bearing according to claim 7 wherein an outer end cap is positioned over each said inner roller guide member in sealed relation with said carriage, said outer end cap defining with said inner roller guide member, raceways to facilitate rolling movement of said rolling elements between said load bearing and return raceways.

9. Linear motion bearing according to claim 8 wherein said roller retainer members are formed integral with said inner roller guide member.

10. Linear motion bearing according to claim 9 wherein each said roller retainer members are formed of two sections, each extending over a portion of the length of said carriage and each being attached to the opposing section by adhesives or ultrasonic welding.

11. Linear motion bearing according to claim 10 wherein said inner roller guide member defines a generally semi-cylindrical member positioned between each pair of loaded and unloaded raceways when said guide member is positioned against the end portion of said carriage, each said inner roller guide member further defining a pair of openings adjacent to said generally semi-cylindrical member to facilitate and to thereby guide movement of said rollers between said loaded and unloaded raceways.

12. The linear motion bearing according to claim 11 wherein said outer end cap defines a generally semi-cylindrical recess configured, dimensioned and positioned to receive said generally semi-cylindrical guide member and to define therewith an arcuate roller recirculation track to facilitate and guide movement of said rollers between said loaded and said unloaded raceways.

13. The linear motion bearing according to claim 9 wherein said outer end cap defines a generally semi-cylindrical recess configured, dimensioned and positioned to receive said generally semi-cylindrical guide member and to define therewith an arcuate roller recirculation track to facilitate and guide movement of said rollers between said loaded and said unloaded raceways.

14. Linear motion bearing which comprises:

a rail having a plurality of load bearing surfaces having a generally convex cross-sectional configuration;

a bearing carriage having a plurality of load bearing surfaces which define with said load bearing surfaces of said rail, a plurality of load bearing raceways for reception of a plurality of cylindrical rolling elements, said carriage further defining a plurality of return raceways communicating with said load bearing raceways for conducting said plurality of cylindrical rolling elements between said load bearing raceways and respective return raceways, said rolling elements supporting said carriage against said rail when in a load bearing raceway, each said load bearing surface having a generally convex cross-sectional configuration such that said surface contacts said rolling elements generally centrally thereof;

roller retainer means configured and dimensioned to retain said rolling elements in position in said raceways, said roller retainer means being connected at each end thereof to an inner guide cap defining guide means for guiding said rolling elements between said load bearing raceways and said return raceways; and an outer end cap positioned over each said inner guide cap and including turnaround tracks connecting said load bearing raceways and said return raceways.

* * * * *

UNITED STATES PATENT AND TRADEMARK OFFICE
CERTIFICATE OF CORRECTION

PATENT NO. : 5,005,988

DATED : April 9, 1991

INVENTOR(S) : Gregory S. Lyon

It is certified that error appears in the above-identified patent and that said Letters Patent is hereby corrected as shown below:

On the title page: above-identified patent, under the section entitled "References Cited U.S. PATENT DOCUMENTS", add the following after "4,576,422 3/1986 Laszlo et al.":

```
3,964,802   6/1976   Pitner
3,977,736   8/1976   Pitner
4,102,553   7/1978   Ernst et al.
4,181,375   1/1980   Ernst et al.
4,293,166  10/1981   Ernst et al.
4,463,992   8/1984   Heine
4,556,262  12/1985   Geka
4,561,703  12/1985   Dabringhaus
4,579,395   4/1986   Teramachi
4,614,382   9/1986   Teramachi
4,702,622  10/1987   Teramachi
4,702,623  10/1987   Borel
4,715,729  12/1987   Tanaka
4,715,730  12/1987   Magnuson
```

Signed and Sealed this

Twenty-seventh Day of April, 1993

*Attest:*

MICHAEL K. KIRK

*Attesting Officer*  *Acting Commissioner of Patents and Trademarks*